(12) United States Patent
Levine et al.

(10) Patent No.: US 9,203,829 B1
(45) Date of Patent: Dec. 1, 2015

(54) UNIFIED USER LOGIN

(71) Applicant: Google Inc., Mountain View, CA (US)

(72) Inventors: Jonathan Philip Levine, Allentown, PA (US); Eric Sachs, Redwood City, CA (US); Guibin Kong, Mountain View, CA (US); Naveen Agarwal, Mountain View, CA (US)

(73) Assignee: Google Inc., Mountain View, CA (US)

( * ) Notice: Subject to any disclaimer, the term of this patent is extended or adjusted under 35 U.S.C. 154(b) by 91 days.

(21) Appl. No.: 13/945,743

(22) Filed: Jul. 18, 2013

Related U.S. Application Data

(60) Provisional application No. 61/673,167, filed on Jul. 18, 2012.

(51) Int. Cl.
*H04L 9/32* (2006.01)
*H04L 29/06* (2006.01)
*G06F 15/16* (2006.01)
*H04L 9/00* (2006.01)
*G06F 21/00* (2013.01)

(52) U.S. Cl.
CPC .............. *H04L 63/0815* (2013.01); *H04L 9/32* (2013.01); *G06F 15/16* (2013.01); *G06F 21/00* (2013.01); *H04L 9/00* (2013.01)

(58) Field of Classification Search
USPC ......... 726/8, 4, 5, 10; 713/155, 156; 709/224, 709/227
See application file for complete search history.

(56) References Cited

U.S. PATENT DOCUMENTS

| | | | |
|---|---|---|---|
| 2003/0149781 A1* | 8/2003 | Yared et al. ................... | 709/229 |
| 2006/0053296 A1* | 3/2006 | Busboom et al. ............. | 713/182 |
| 2007/0150942 A1* | 6/2007 | Cartmell ......................... | 726/5 |
| 2008/0320576 A1* | 12/2008 | Curling ............................ | 726/8 |

* cited by examiner

*Primary Examiner* — Brandon Hoffman
*Assistant Examiner* — Samuel Ambaye
(74) *Attorney, Agent, or Firm* — Patent Law Works LLP

(57) ABSTRACT

A system and method for enabling, on any website, a unified user login that supports login through multiple known identity providers and, if necessary, the website's legacy login are disclosed. In one example, the system comprises a login receiver module, an identity provider determination module, a legacy account module, a federated account module and a login module. The login receiver module receives a login request associated with a user identifier. The identity provider determination module determines whether the login request is associated with a known identity provider. The legacy account module performs legacy account creation and/or legacy login verification when the address is not associated with any known identity provider. Otherwise, the federated account module performs federated account creation and/or federated login verification. The login module logs the user into the account responsive to one or more of verification and account creation.

15 Claims, 8 Drawing Sheets

UNIFIED USER LOGIN

This application claims the benefit under 35 U.S.C. §119 (e) of U.S. Patent Application No. 61/673,167, entitled "Unified User Login" filed Jul. 18, 2012, the entire contents of which are incorporated herein by reference.

BACKGROUND

The specification relates to online user login. In particular, the specification relates to enabling user login with an identity provider, specifically, enabling, on any website, a unified user login that supports login through multiple known identity providers and, if necessary, the website's legacy login.

Many websites provide the capability for users to login to view their personal information, or other information that the user wants to keep private, or even access the functionality provided by the website. Oftentimes, the user logs in by entering the user identifier and a password in order to access the information and/or functionality. The website then compares the password entered at login with the correct password associated with the e-mail address. This is not ideal because a user must remember multiple passwords, which is inconvenient, or a user reuses the same password on multiple websites, which compromises the security of all websites if one website is compromised. Moreover, not all websites are created equally in terms of encryption and security. In response to such concerns, identity service providers (IDPs) have been created. Rather than a website authenticating the user's identity in order to access the website, the website (sometimes referred to herein as a "requesting party" or "RP") requests that an IDP authenticate the user, and, if the user is authenticated by the IDP, the RP permits access (i.e., the user is granted access to the website).

However, a first problem is that current systems require a website administrator to perform significant coding, which may be difficult and time consuming, to support an IDP. A second problem is that the coding in the current systems may be unique to that IDP; therefore, new coding is required to support each additional IDP. A third problem is that the various IDPs do not produce the same cryptographic data responsive to authenticating a user, so a requesting party needs separate verification software for each IDP the requesting party wants to support. A fourth problem is that often requesting parties already have a significant number of user accounts protected by password (occasionally referred to as "legacy accounts") and transitioning the legacy accounts to accounts accessed using an IDP presents challenges (occasionally referred to as "federated accounts").

SUMMARY

The specification overcomes the deficiencies and limitations of the prior art at least in part by providing a system and method for enabling user login with an identity provider for any website.

According to one innovative aspect of the subject matter described in this disclosure, a login receiver module operable to receive a login request to access an account, wherein the login request is associated with a user identifier; an identity provider determination module operable to determine whether the login request is associated with a known identity provider based at least in part on the e-mail address, wherein the e-mail address is associated with one known identity provider at most; a legacy account module operable to perform one or more of legacy account creation and legacy login verification responsive to a determination that the e-mail address is not associated with any known identity provider; a federated account module operable to perform one or more of federated account creation and federated login verification responsive to a determination that the e-mail address is associated with the known identity provider; and a login module operable to log the user into the account responsive to one or more of verification by the legacy account module or the federated account module and account creation by the legacy account module or the federated account module, the login module communicatively coupled to receive one or more of verification and account creation from one or more of the legacy account module and the federated account module.

In general another innovative aspect of the subject matter described in this disclosure may be embodied in methods that include receiving a login request to access an account, wherein the login request is associated with a user identifier; determining whether the login request is associated with a known identity provider based at least in part on the e-mail address; directing the user to the known identity provider for authentication responsive to determining that the login request is associated with the known identity provider; receiving assertion data and information responsive to the known identity provider authenticating the user; verifying assertion data using an online verification service; and logging the user into the account responsive to the verification of the assertion data and information.

Other aspects include corresponding methods, systems, apparatus, and computer program products. These and other implementations may each optionally include one or more of the following features. For instance, the operations further include: sending an error message responsive to unsuccessful verification of the assertion data; and prompting the user to create another login request. For instance, the operations further include: determining that the user is associated with an existing account after verifying the assertion data; and wherein logging the user into the account is responsive to the verification of the assertion data and the determination that the user is associated with the existing account. For instance, the operations further include: determining that the user is not associated with any existing account after verifying the assertion data; creating a new account for the user responsive to the determination that the user is not associated with any existing account; and wherein logging the user into the account is responsive to the verification of the assertion data and the creation of the new account. For instance, the operations further include: directing the user to the account's legacy login page responsive to determining that the e-mail address is not associated with any known identity provider and determining the user is associated with an existing account; receiving the user's legacy password, wherein the legacy password is the user's password for the account; verifying the user based at least in part on the legacy password; and logging the user into the account responsive to verifying the user based at least in part on the legacy password. For instance, the operations further include: directing the user to the account's legacy account creation page responsive to determining that the e-mail address is not associated with any known identity provider and determining that the user is not associated with an existing account; creating a new account including a legacy password; and logging the user into the new account responsive to the creation of the new account. For instance, the operations logging the user into the account further include: creating a user session; directing the user to the account's home page; and updating an account chooser. For instance, the features include: the login request is one or more of the user entering the user identifier, the user selecting an account from an account chooser, and the user selecting an identity provider; whether the e-mail address is associated with the known identity provider is determined based at least in part on the domain of the e-mail address; the e-mail address is associated with one known identity provider.

The features and advantages described herein are not all-inclusive and many additional features and advantages will be apparent in view of the figures and description. Moreover, it should be noted that the language used in the specification has been principally selected for readability and instructional purposes, and not to limit the scope of the subject matter disclosed herein.

BRIEF DESCRIPTION OF THE DRAWINGS

The implementations are illustrated by way of example, and not by way of limitation in the figures of the accompanying drawings in which like reference numerals are used to refer to similar elements.

DETAILED DESCRIPTION

Figure 1:
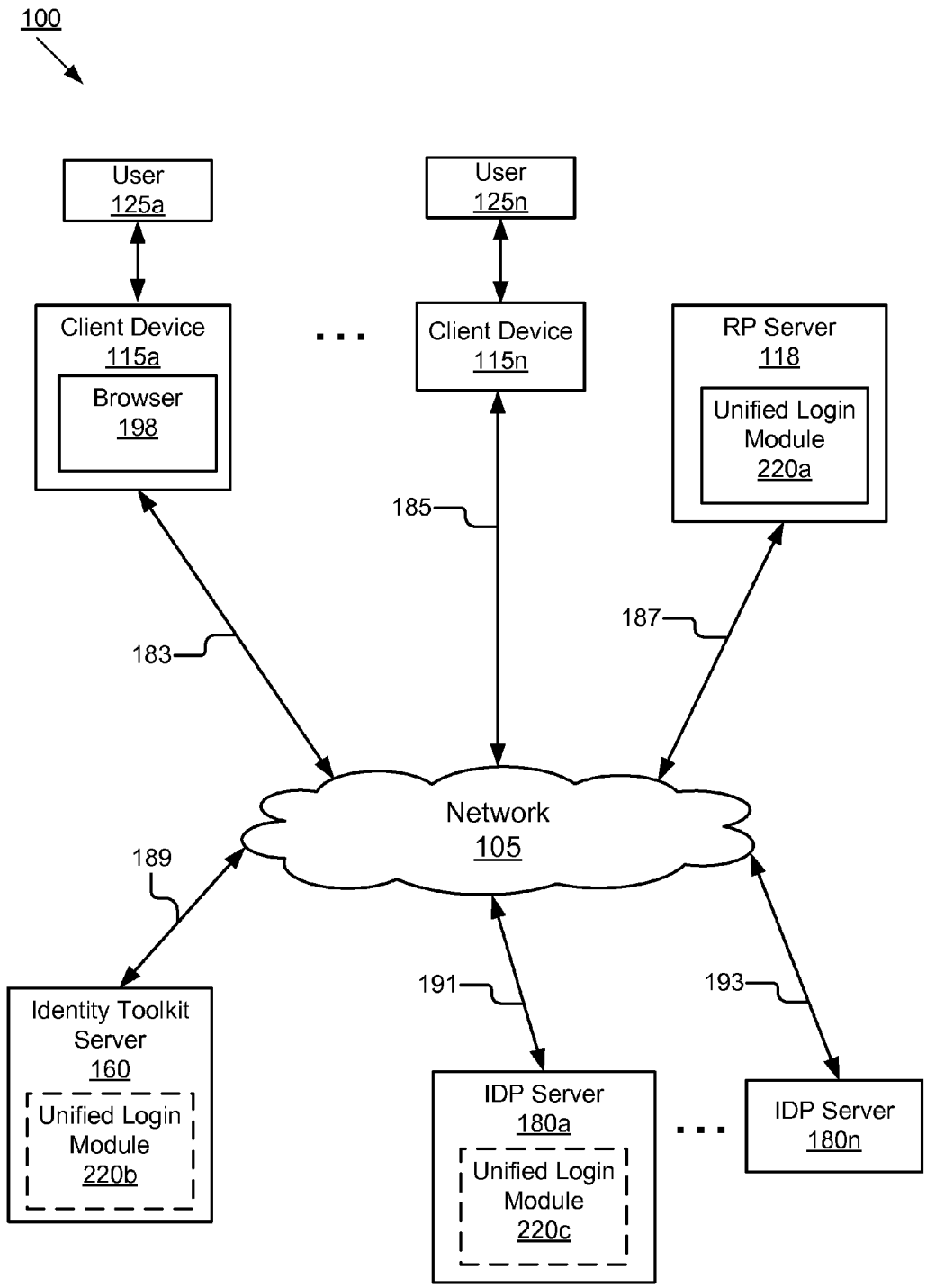
FIG. 1 illustrates a system for enabling, on any website, a unified user login that supports login through multiple known identity providers and, if necessary, the website's legacy login according to one implementation.

A system and method for enabling, on any website, a unified user login that supports login through multiple known identity providers and, if necessary, the website's legacy login. In the following description, for purposes of explanation, numerous specific details are set forth in order to provide a thorough understanding of the implementations. It will be apparent, however, that the implementations can be practiced without these specific details. In other instances, structures and devices are shown in block diagram form in order to avoid obscuring the implementations. For example, one implementation is described below with reference to user interfaces and particular hardware. However, the present implementations apply to any type of computing device that can receive data and commands, and any peripheral devices providing services.

Reference in the specification to "one implementation" or "an implementation" means that a particular feature, structure, or characteristic described in connection with the implementation is included in at least one implementation. The appearances of the phrase "in one implementation" in various places in the specification are not necessarily all referring to the same implementation.

Some portions of the detailed descriptions that follow are presented in terms of algorithms and symbolic representations of operations on data bits within a computer memory. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including, for example, "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present implementations also relate to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, including, but not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The implementations can take the form of an entirely hardware implementation, an entirely software implementation or an implementation containing both hardware and software elements. An exemplary implementation is implemented in software, which includes but is not limited to firmware, resident software, microcode, etc.

Furthermore, the implementations can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present implementations are not described with reference to any particular programming language. It will be appreciated that a variety of programming languages may be used to implement the teachings of the implementations as described herein.

FIG. 1 illustrates a block diagram of a system 100 for enabling, on any website, a unified user login that supports login through multiple known identity providers and, if necessary, the website's legacy login according to one implementation. The illustrated system 100 includes client devices 115a, 115b, and 115n (also referred to collectively as client devices 115 or individually as client device 115) that are accessed by users 125a, 125b, and 125n (also referred to collectively as users 125 or individually as user 125), a requesting party (RP) server 118, identity provider (IDP) servers 180a, 180n (also referred to collectively as IDP servers 180 or individually as IDP server 180) and an identity toolkit server 160. In the illustrated implementation, these entities are communicatively coupled via a network 105. Although only two client devices 115 are illustrated, any number of client devices 115 are available to any number of users 125.

The client devices 115 in FIG. 1 are used by way of example. While FIG. 1 illustrates two client devices 115, the present specification applies to any system architecture having one or more client devices 115. Furthermore, while only one network 105 is coupled to the client devices 115, the RP server 118, the IDP servers 180 and the identity toolkit server 160, in practice any number of networks 105 can be connected to the entities. Furthermore, while only one RP server 118 and one identity toolkit server 160 are shown, the system 100 can include multiple RP servers 118 and/or multiple identity toolkit servers 160.

The RP server 118 is a server associated with a requesting party (RP). A requesting party is an entity that requires a user to login in order to access one or more of the services, functionality, data and information provided and/or maintained by the RP server 118. In one implementation, the requesting party requires a user login based at least in part on the user identifier, and the RP server 118 logs the user into the RP server based at least in part on the e-mail address. For example, the user provides his/her e-mail as a username to login, and the RP server 118, subject to user authentication, logs the user into the user account associated with that e-mail address. In one implementation, the RP server 118 is a login server. For example, the RP server 118 is a login server for an online gaming website that requires user authentication prior to allowing its customers to access and play a game. In another implementation, the RP server 118 is a server that hosts a website. For example, the RP server 118 hosts a news website that requires users to login prior to reading news articles.

An IDP server 180 is a server operated by an identity provider (IDP) to generate and assert one or more of authentication, authorization and identity information about users to another entity (e.g., a RP server 118). Authentication, authorization and identity information about users are occasionally referred to individually and collectively as "assertion data" herein. In one implementation, the IDP server 180 asserts assertion data by sending the assertion data. For clarity and convenience, this specification makes extensive use of implementations in which assertion data is sent; however, it will be recognized that the assertion data may be retrieved from the IDP server 180 instead. In one implementation, the IDP server 180 generates and sends assertion data responsive to a user successfully authenticating himself/herself to the IDP server 180. For example, assume the RP requires a user to login in order to access the RP server 118 and as part of the login the user must authenticate himself/herself, so the user is directed to the IDP server 180 so that the IDP can authenticate the user. Responsive to a user successfully authenticating himself/herself to the IDP, the IDP server 180 generates and sends assertion data to the RP server 118.

IDP authentication is beneficial in that the user need not memorize multiple passwords for multiple websites, thereby decreasing the burden on users. The user need only remember one set of credentials (e.g. a password) for the IDP. IDP authentication also beneficially ensures that the user does not reuse the same password at multiple websites and thereby compromise security. For example, assume a user uses the same password to access the user's online bank and to checkout at a small online retailer. Assume also that the password was obtained by a fraudulent user from the small online retailer, because, for example, the small online retailer did not have sophisticated or robust security. The security of the user's online bank, which may have been substantial, is now compromised, because the fraudulent user has the user's correct password. Authentication using an IDP beneficially ensures greater security for the user's information. IDPs are generally run by larger entities with greater resources for providing robust security such as fraud prevention/detection and encryption than a typical website (i.e. a requesting party) can devote. Therefore, IDP authentication advantageously provides users greater security for user data. The burden on the website to protect login information is also diminished, which can potentially and beneficially free resources for other uses.

The identity toolkit server 160 is a server operable to verify assertion data generated by the IDP server 180. Using an identity toolkit server 160 to verify assertion data rather than software run locally on the RP server 118 provides a number of benefits. First, the need for each requesting party's administrator to purchase and install software is eliminated, thereby reducing the burden on each requesting party. Second, because security protocols and encryption are dynamic in that they change and evolve, the assertion data generated by IDP servers 180 is also likely to be dynamic. Updating a single identity toolkit server 160 or set of identity toolkit servers 160 is much more efficient than requiring all requesting parties to individually update, or re-purchase, assertion data verification software with every change and evolution. The identity toolkit server 160 beneficially provides a potentially lower cost, lower upkeep and more up-to-date system for verifying assertion data generated by an IDP.

In one implementation, a unified login module 220a is included in the RP server 118 and is operable on the RP server 118, which is connected to the network 105 via signal line 187. In another implementation, the unified login module 220b is included in the identity toolkit server 160 and is operable on the identity toolkit server 160, which is connected to the network 105 via signal line 189. In yet another implementation, the unified login module 220c is included in one or more of the IDP servers 180a and 180n and is operable on one or more of the IDP servers 180a and 180n, which are connected to the network 105 via signal lines 191 and 193, respectively. It will be recognized that although only one IDP server 180a is shown as including a unified login module 220c any number of IDP servers 180 may include unified login module 220c. It will also be recognized that the unified login module 220a/220b/220c (referred to generally as the unified login module 220) can be stored in any combination on the servers 118, 160, 180. In some implementations the unified login module 220 includes multiple, distributed modules that cooperate with each other to perform the functions described below. Details describing the functionality and components of the unified login module 220 are explained in further detail below with regard to FIGS. 3-6.

The network 105 enables communications between the client devices 115, the RP server 118, the IDP servers 180 and the identity toolkit server 160. Thus, the network 105 can include links using technologies including, for example, Wi-Fi, Wi-Max, 2G, Universal Mobile Telecommunications System (UMTS), 3G, Ethernet, 802.11, integrated services digital network (ISDN), digital subscriber line (DSL), asynchronous transfer mode (ATM), InfiniBand, PCI Express Advanced Switching, etc. Similarly, the networking protocols used on the network 105 can include the transmission control protocol/Internet protocol (TCP/IP), multi-protocol label switching (MPLS), the User Datagram Protocol (UDP), the hypertext transport protocol (HTTP), the simple mail transfer protocol (SMTP), the file transfer protocol (FTP), lightweight directory access protocol (LDAP), Code Division Multiple Access (CDMA), Wideband Code Division Multiple Access (WCDMA), Global System for Mobile communications (GSM), High-Speed Downlink Packet Access (HSDPA), etc. The data exchanged over the network 105 can be represented using technologies and/or formats including the hypertext markup language (HTML), the extensible markup language (XML), etc. In addition, all or some of links can be encrypted using conventional encryption technologies, for example, the secure sockets layer (SSL), Secure HTTP and/or virtual private networks (VPNs) or Internet Protocol security (IPsec). In another implementation, the entities can use custom and/or dedicated data communications technologies instead of, or in addition to, the ones described above. Depending upon the implementation, the network 105 can also include links to other networks.

In one implementation, the network 105 is a partially public or a wholly public network, for example, the Internet. The network 105 can also be a private network or include one or more distinct or logical private networks (e.g., virtual private networks, Wide Area Networks ("WAN") and/or Local Area Networks ("LAN")). Additionally, the communication links to and from the network 105 can be wireline or wireless (i.e., terrestrial or satellite-based transceivers), and may have any number of configurations such as a star configuration, token ring configuration or other configurations. In one implementation, the network 105 is an IP-based wide or metropolitan area network.

In the illustrated implementation, the client devices 115a and 115n are coupled to the network 105 via signal lines 183 and 185, respectively. The user 125a can interact with the client device 115a. Similarly, the user 125n can interact with the client device 115b. The RP server 118 is communicatively coupled to the network 105 via signal line 187. The identity toolkit server is communicatively coupled to the network 105 via signal line 189. The IDP servers 180a and 180n are communicatively coupled to the network 105 via signal lines 191 and 193, respectively.

The client device is any computing device. The client device 115 can be, for example, a laptop computer, a desktop computer, a tablet computer, a mobile telephone, a personal digital assistant (PDA), a mobile email device, a portable game player, a portable music player, etc. It will be recognized that other types of client devices are possible. In one implementation, the system 100 includes a combination of different client devices 115. For example, a plurality of different client devices 115 is any combination of a personal computer, a smart phone and a tablet computer.

In one implementation, the client device 115 includes a browser 198. In one implementation, the browser 198 is code and routines stored in a memory (not pictured) of the client device 115 and executed by a processor (not pictured) of the client device 115. In one implementation, the browser is able to interact with the various servers (e.g., the RP server 118 and IDP servers 180) and client devices 115 of the system 100 via the network 105 and is used by a user 125 to access information in the system 100. It will be recognized that although only one client device 115 is shown as including a browser 198 any number of client devices 115 may include a browser 198. The user 125 is a human user of the client device 115.

Figure 2:
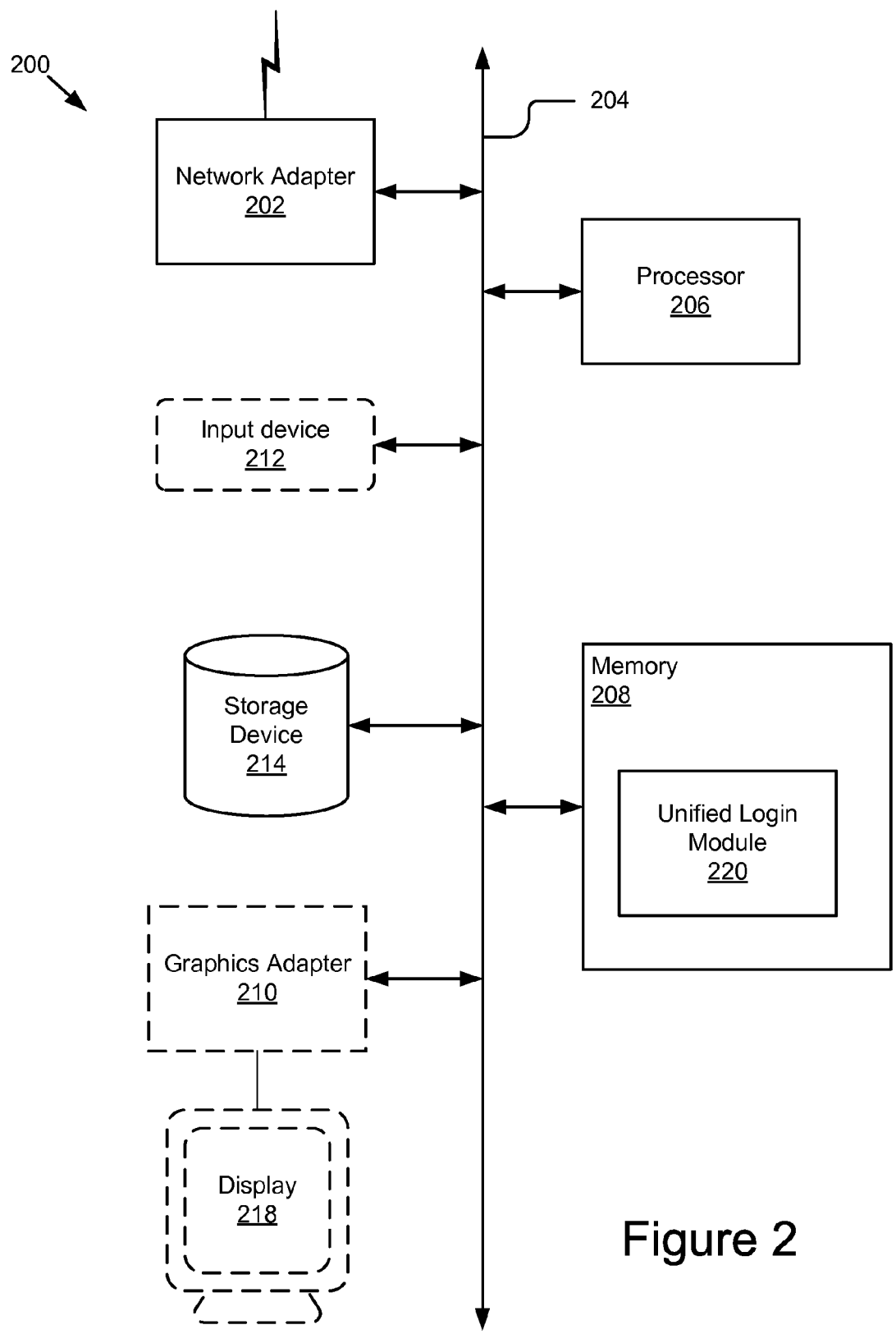
FIG. 2 is a block diagram illustrating a computing device according to one implementation.

FIG. 2 is a block diagram of an implementation of a computing device 200 according to one implementation. As illustrated in FIG. 2, the computing device 200 includes a network adapter 202 coupled to a bus 204. According to one implementation, also coupled to the bus 204 are at least one processor 206, memory 208, a graphics adapter 210, an input device 212, and a storage device 214. The memory 208 includes a unified login module 220. In one implementation, the functionality of the bus 204 is provided by an interconnecting chipset. The computing device 200 also includes a display 218, which is coupled to the graphics adapter 210.

The processor 206 may be any general-purpose processor. The processor 206 includes an arithmetic logic unit, a microprocessor, a general purpose controller or some other processor array to perform computations and execute code and routines. The processor 206 is coupled to the bus 204 for communication with the other components of the computing device 200. Processor 206 processes data signals and may include various computing architectures including a complex instruction set computer (CISC) architecture, a reduced instruction set computer (RISC) architecture, or an architecture implementing a combination of instruction sets. Although only a single processor is shown in FIG. 2, multiple processors may be included. The processing capability may be limited to supporting the display of images and the capture and transmission of images. The processing capability might be enough to perform more complex tasks, including various types of feature extraction and sampling. The computing device 200 also includes an operating system executable by the processor including but not limited to WINDOWS®, MacOS X, Android or UNIX® based operating systems. Other processors, operating systems, sensors, displays and physical configurations are possible.

The memory 208 is a non-transitory storage medium. The memory 208 holds instructions and/or data that may be executed by the processor 206. In one implementation, the instructions and/or data stored on the memory 208 include code for performing any and/or all of the techniques described herein. The memory 208 may be a dynamic random access memory (DRAM) device, a static random access memory (SRAM) device, flash memory or some other memory device. In one implementation, the memory 208 also includes a non-volatile memory or similar permanent storage device and media, for example, a hard disk drive, a floppy disk drive, a CD-ROM device, a DVD-ROM device, a DVD-RAM device, a DVD-RW device, a flash memory device, or some other mass storage device for storing information on a more permanent basis. The memory 208 is coupled by the bus 204 for communication with the other components of the computing device 200. In one implementation, the unified login module 220 is stored in memory 208 and executable by the processor 206.

The computing device 200, in one implementation, is a RP server 118. In another implementation, the computing device 200 is an IDP server 180. In yet another implementation, the computing device 200 is an identity toolkit server 160.

The storage device 214 is any device capable of holding data, like a hard drive, compact disk read-only memory (CD-ROM), DVD, or a solid-state memory device. The storage device 214 is a non-volatile memory device or similar permanent storage device and media. The storage device 214 stores data and instructions for processor 208 and includes one or more devices including a hard disk drive, a floppy disk drive, a CD-ROM device, a DVD-ROM device, a DVD-RAM device, a DVD-RW device, a flash memory device, or some other mass storage device.

The input device 212 may include a mouse, track ball, or other type of pointing device to input data into the computing device 200. The input device 212 may also include a keyboard, for example, a QWERTY keyboard or any other physical or soft keyboard in any language. The input device 212 may also include a microphone, a web camera or similar audio or video capture device. The graphics adapter 210 displays images and other information on the display 218. The display 218 is a conventional type, for example, a liquid crystal display (LCD) or any other similarly equipped display device, screen, touchscreen or monitor. The display 218 represents any device equipped to display electronic images and data as described herein. The network adapter 202 couples the computing device 200 to a local or wide area network.

The unified login module 220 is code and routines executable by the processor 206 to enable, on any website, a unified user login that supports login through multiple known identity providers and, if necessary, the website's legacy login. In one implementation, the unified login module 220 is a set of instructions executable by the processor 206. In another implementation, the unified login module 220 is stored in the memory 208 and is accessible and executable by the processor 206. Details describing the functionality and components of the unified login module 220 are explained in further detail below in reference to FIGS. 3-6.

A computing device 200 can have different and/or other components than those shown in FIG. 2. For example, the computing device can have speakers or another form of audio output. In addition, the computing device 200 can lack certain illustrated components. For example, in one implementation, the computing device 200 is an identity toolkit server 160 and lacks an input device 212, graphics adapter 210 and/or display 218. Moreover, the storage device 214 can be local and/or remote from the computing device 200 (e.g., a storage area network (SAN)).

The computing device 200 is adapted to execute computer program modules for providing the functionality described herein. As used herein, the term "module" refers to computer program logic utilized to provide the specified functionality. Thus, a module can be implemented in hardware, firmware, and/or software. In one implementation, program modules are stored on the storage device 214, loaded into the memory 208 and executed by the processor 206.

Implementations of the entities described herein can include other and/or different modules than the ones described here. In addition, the functionality attributed to the modules can be performed by other or different modules in other implementations. Moreover, this description occasionally omits the term "module" for purposes of clarity and convenience.

Figure 3:
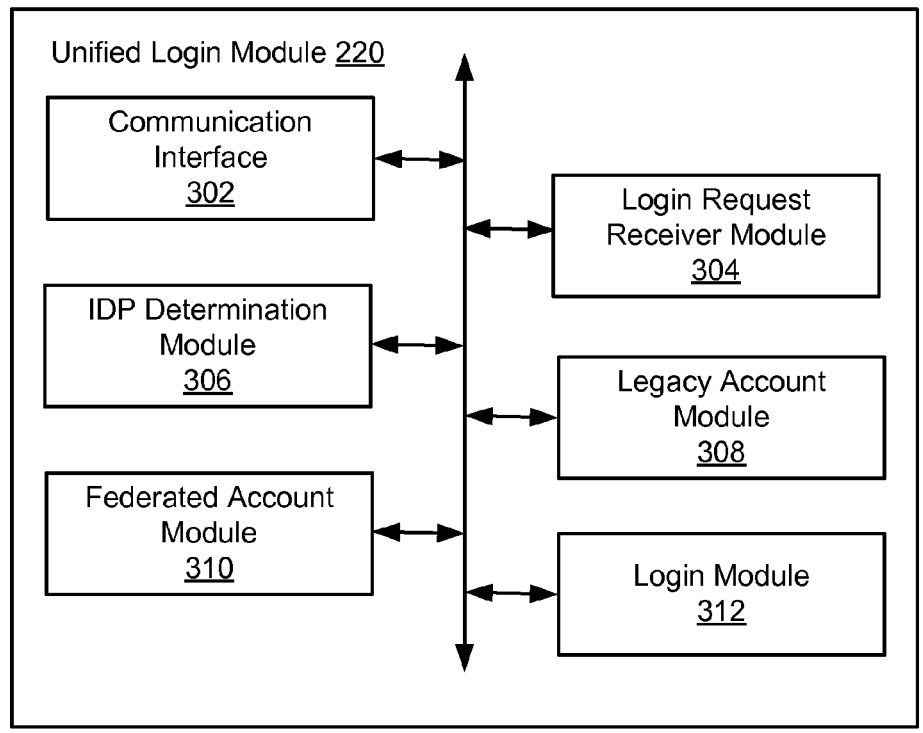
FIG. 3 is a block diagram illustrating a unified login module according to one implementation.

Referring now to FIG. 3, the unified login module 220 is shown in more detail. FIG. 3 is a block diagram of the unified login module 220 included in a computing device 200 (e.g., a RP server 118).

In one implementation, the unified login module 220 includes a communications interface 302, a login request receiver module 304, an IDP determination module 306, a legacy account module 308, a federated account module 310 and a login module 312.

It will be recognized that the modules 302, 304, 306, 308, 310, 312 included in the unified login module 220 are not necessarily all on the same computing device 200. In one implementation, the modules 302, 304, 306, 308, 310, 312 are distributed across multiple computing devices 200. For example, in one implementation, the communication interface 302, the login request receiver module 304, the legacy account module 308 and the login module 312 are included in RP server 118 and the other modules 306, 310 are included in the identity toolkit server 160. It will be recognized that the preceding is just an example of distributing modules across multiple computing devices 200 and that other examples exist.

The communication interface 302 is code and routines for handling communications between the login request receiver module 304, the IDP determination module 306, the legacy account module 308, the federated account module 310 and the login module 312 and other components of the computing device 200. In one implementation, the communication interface 302 is a set of instructions executable by the processor 206. In another implementation, the communication interface 302 is stored in the memory 208 and is accessible and executable by the processor 206. In either implementation, the communication interface 302 is adapted for cooperation and communication with the processor 206, other components of the computing device 200 and other components of the unified login module 220.

The communication interface 302 handles communications between the login request receiver module 304, the IDP determination module 306, the legacy account module 308, the federated account module 310 and the login module 312 and other components of the computing device 200. For example, the communication interface 202 communicates with the login request receiver module 304 and the IDP determination module 306 to pass the output of the login request receiver module 304 (i.e., a login request) to the IDP determination module 306. However, this description may occasionally omit mention of the communication interface 302 for purposes of clarity and convenience. For example, for purposes of clarity and convenience, the above scenario may be described as the login request receiver module 304 passing a login request to the IDP determination module 306.

The login request receiver module 304 is code and routines for receiving login requests from users 125 of client devices 115. In one implementation, the login receiver module 304 is a set of instructions executable by the processor 206. In another implementation, the login receiver module 304 is stored in the memory 208 and is accessible and executable by the processor 206. In either implementation, the login receiver module 304 is adapted for cooperation and communication with the processor 206, other components of the computing device 200 and other components of the unified login module 220.

The login receiver module 304 receives login requests from users 125 of client devices 115. A login request is a user request to access one or more of the services, functionality, data and information provided and/or maintained by a requesting party (e.g., on a RP server 118). In one implementation, the requesting party requires the user to login based at least in part on the user identifier, and the login request is, therefore, based at least in part on the user identifier. For example, the user accounts on the RP server 118 are identified based at least in part on user e-mail address, so the user must provide his/her e-mail address to identify the account that the user wishes to log into.

In one implementation, an e-mail address includes a user's e-mail username and a domain separated by the @ ("at") symbol. For example, assume an e-mail has the form "user1@email.com" where "user1" is the user's e-mail username, "email" is the domain name of the user's e-mail provider, and "com" is a generic top-level domain. It will be recognized that an e-mail address may include other and/or different components such as including a country code and/or a different top-level domain such as gov, edu, org, net, mil, etc. It will be further recognized that the preceding are merely examples of an e-mail address, e-mail address components and e-mail address formatting and that other examples exist.

In some implementations, the login receiver module 304 generates a graphical user interface (GUI) that is displayed to a user 125. The user 125 interacts with the GUI to generate a login request, which is received by the login request receiver module 304. In one implementation, the GUI includes one or more of an account chooser for receiving an account selection, an IDP chooser for receiving an IDP selection, and a user identifier field for receiving the user identifier. For example, the GUI is a pop-up window that includes one or more of an account chooser, IDP chooser and a user identifier field.

In one implementation, the GUI includes an account chooser. An account chooser enables a user to select a user account to sign into. For example, assume user1@email.com previously signed into the requesting party website, in one implementation, the GUI includes an account chooser where the user can select to login as user1@email.com by selecting a button associated with user1@email.com, thereby generating a login request received by the login receiver module 304. The login request in this example is based at least in part on the user identifier because the login request includes the user identifier.

In one implementation, the GUI includes an IDP chooser. An IDP chooser enables a user to select the known IDP associated with the user identifier. For example, assume the user identifier is user1@email.com. Also assume that the domain "email" is associated with the known IDP "IDP1," the user selects an IDP1 button to request to login using IDP1 as his/her IDP, thereby generating a login request received by the login receiver module 304. The login request in this example is based at least in part on the user identifier because the login request is based on the selection of a known IDP associated with the user identifier.

In one implementation, the GUI includes an e-mail address field. An e-mail address field enables the user to enter the user identifier. For example, the user desires to login to the account associated with the e-mail address user1@email.com, so the user enters user1@email.com, thereby generating a login request received by the login receiver module 304. The login request in this example is based at least in part on the user identifier because the login request is the user identifier.

In one implementation, the login request receiver module 304 passes the login request to the IDP determination module 306. For example, the login request receiver module 304 is communicatively coupled to the IDP determination module 306 to send the login request to the IDP determination module 306. In another implementation, the login request receiver module 304 (or the communication interface 302) stores the login request in the storage device 214 (or any other non-transitory storage medium communicatively accessible). The other modules of the unified login module 220 including the IDP determination module 306 can retrieve the login request by accessing the storage device 214 (or other non-transitory storage medium).

The IDP determination module 306 is code and routines for determining which, if any, of one or more known IDPs the login request is associated with. In one implementation, the IDP determination module 306 is a set of instructions executable by the processor 206. In another implementation, the IDP determination module 306 is stored in the memory 208 and is accessible and executable by the processor 206. In either implementation, the IDP determination module 306 is adapted for cooperation and communication with the processor 206, other components of the computing device 200 and other components of the unified login module 220.

The IDP determination module 306 determines which, if any, of one or more known IDPs the login request is associated with. A known IDP is an IDP associated with at least one e-mail domain. For example, assume CompanyA, CompanyB and CompanyC operate as IDPs (e.g., each owns and maintains an IDP server 180. CompanyA, CompanyB and CompanyC own (i.e., they are associated with) the e-mail domains companyA, companyB and companyC, respectively. Therefore, in one implementation, CompanyA, CompanyB and CompanyC are known IDPs, because each is an IDP and each is associated with at least one e-mail domain. A known IDP generates and sends assertion data for those users associated with an e-mail address including the domain associated with the known IDP. For example, the CompanyA IDP will generate and send assertion data to authenticate users whose e-mail address is a CompanyA address (e.g., user1@companyA.com); the CompanyB will generate and send assertion data for users whose e-mail address is a CompanyB address (e.g., user1@companyB.com); and the CompanyC will generate and send assertion data for users whose e-mail address is a CompanyC address (e.g., user1@companyC.com).

In one implementation, the requesting party, or its website administrator, can modify the one or more known IDPs. In one such implementation, the administrator may modify one or more known IDPs based on one or more criteria including but not limited to the popularity of the IDP (e.g., the number of e-mail addresses associated with the IDP), the relative security of the IDP and the geographic demographic. For example, assume that a requesting party is primarily focused on serving users that for whatever reason tend to not have e-mail address associated with a particular domain, in one implementation, the requesting party modifies the known IDPs such that the IDP associated with the uncommon e-mail domain is not a known IDP. In one implementation, the known IDPs are periodically updated. For example, in one implementation, as new IDPs are created the new IDPs, if associated with at least one e-mail domain, become new known IDPs. For example, the IDP determination module 306 receives automatic updates. In another example, the IDP determination module 306 resides on a server (e.g. the identity toolkit server 160) that is periodically updated.

In one implementation, the one or more known IDPs appear in the GUI generated by the login receiver module 304. For example, assuming that CompanyA, CompanyB and CompanyC are known IDPs, in one implementation, a "CompanyA" button, a "CompanyB" button and a "CompanyC" button appear in an IDP chooser. In one implementation, the requesting party, or its website administrator, can modify the one or more known IDPS that appear in the GUI generated by the login receiver module 304. For example, the requesting party can modify the GUI such that only the two or three most utilized known IDPs appear in the IDP chooser.

The IDP determination module 306 determines which, if any, of one or more known IDPs the login request is associated with. This determination may vary depending on how the login request was generated.

In one implementation, the login request is generated when the user selects an IDP from an IDP chooser. In one such implementation, the IDP determination module 306 compares the selected IDP to a list or table of known IDPs, and if the selected IDP appears on the list or table, determines the selected IDP is a known IDP. For example, assume the user selects the "IDP1" button from an IDP selector, the IDP determination module 306 determines that IDP1 does not appear on the list of known IDPs and is therefore an unknown IDP. In another such implementation, the IDP chooser only includes IDPs that are known IDPs, so the IDP determination module 306 determines that the login request is associated with the known IDP selected from the IDP chooser. For example, assume the user selects the "IDP1" button from an IDP selector, the IDP determination module 306 determines that the login request is associated with IDP1, which is a known IDP.

In other implementation, the login request is generated when the user selects an account from an account chooser or enters an e-mail address into an e-mail address field. In these other implementations, the login request either is or includes an e-mail address, and the IDP determination module 306 determines which, if any, known IDP the login request is associated with from the e-mail address. In one implementation, the known IDP is determined from an account chooser the same as if the e-mail address associated with the account had been entered.

In one implementation, the IDP determination module 306 receives an e-mail address, parses the e-mail address and determines whether the e-mail address is associated with a known IDP. In one implementation, the e-mail address is associated with a known IDP if the domain(s) of the e-mail address match the domain(s) of a known IDP. For example, assume the login requests includes the e-mail address "user1@email.com." The IDP determination module 306 receives the e-mail address and parses the domain "email," or the domains "email.com," from the e-mail address and compares "email," or "email.com" (depending on the implementation), to a table or list of domains of known IDPs. If the domain "email," or the domains "email.com" (depending on the implementation), is on the table or list of domains of known IDPs, the e-mail address and, therefore, the login request is associated with a known IDP.

The IDP determination module 306 assumes that a login request (and, therefore, a user identifier) is associated with at most one known IDP. In one implementation, if the login request is associated with a known IDP, the IDP determination module 306 provides the login request and, in some implementations, the associated known IDP to the federated account module 310 for user authentication via the known IDP and/or account creation. Otherwise, the IDP determination module 306 provides the login request to the legacy account module 308 for user authentication and/or account creation.

In one implementation, the IDP determination module 306 passes one or more of the login request and the associated known IDP (depending on the determination) to either the legacy account module 308 or the federated account module 310 (depending on the determination). For example, the IDP determination module 306 is communicatively coupled to the legacy account module 308 and the federated account module 310 to send one or more of the login request and the associated known IDP (depending on the determination) to either the legacy account module 308 or the federated account module 310 (depending on the determination). In another implementation, the IDP determination module 306 (or the communication interface 302) stores one or more of the login request and the associated known IDP (depending on the determination) in the storage device 214 (or any other non-transitory storage medium communicatively accessible). The other modules of the unified login module 220 including the legacy account module 308 and the federated account module 310 can retrieve (depending on the determination) one or more of the login request and the associated known IDP (depending on the determination) by accessing the storage device 214 (or other non-transitory storage medium).

The legacy account module 308 is code and routines for coordinating authentication and account creation for a user if the login request is not associated with a known IDP and generating a login approval. In one implementation, the legacy account module 308 is a set of instructions executable by the processor 206. In another implementation, the legacy account module 308 is stored in the memory 208 and is accessible and executable by the processor 206. In either implementation, the legacy account module 308 is adapted for cooperation and communication with the processor 206, other components of the computing device 200 and other components of the unified login module 220.

The legacy account module 308 coordinates the authentication of the user if the login request is not associated with a known IDP. In one implementation, responsive to the user successfully authenticating himself/herself via the legacy account module 308, the legacy account module 308 generates a login approval, which causes the login module 312 to log the user into the RP server 118. The legacy account module 308 coordinates the creation of a user account if the login request is not associated with a known IDP and is not associated with an existing user account. In one implementation, responsive to receiving a login request that is not associated with a known IDP or an existing account, the legacy account module 308 coordinates the creation of an account on the RP server 118 and generates a login approval, which causes the login module 312 to log the user into the account. The legacy account module 308 and its functionality are discussed in greater detail below in reference to FIG. 4.

In one implementation, the legacy account module 308 and its functionality are provided by a requesting party's existing user login pages. For example, in one implementation, the user is routed to the requesting party's legacy login screen if the IDP determination module 306 determines that the login request is not associated with a known IDP.

In one implementation, the legacy account module 308 passes the login approval to the login module 312. For example, the legacy account module 308 is communicatively coupled to the login module 312 to send the login approval to the login module 312. In another implementation, the legacy account module 308 (or the communication interface 302) stores the login approval in the storage device 214 (or any other non-transitory storage medium communicatively accessible). The other modules of the unified login module 220 including the login module 312 can retrieve the login approval by accessing the storage device 214 (or other non-transitory storage medium).

The federated account module 310 is code and routines for coordinating authentication and account creation of a user if the login request is associated with a known IDP and generating a login approval. In one implementation, the federated account module 310 is a set of instructions executable by the processor 206. In another implementation, the federated account module 310 is stored in the memory 208 and is accessible and executable by the processor 206. In either implementation, the federated account module 310 is adapted for cooperation and communication with the processor 206, other components of the computing device 200 and other components of the unified login module 220.

The federated account module 310 coordinates the authentication of the user if the login request is associated with a known IDP and generating a login approval. In one implementation, responsive to the user successfully authenticating himself/herself via the federated account module 310, the federated account module 310 generates a login approval, which causes the login module 312 to log the user into the account on the RP server 118. The federated account module 310 coordinates the creation of a user account if the login request is associated with a known IDP but is not associated with an existing user account. In one implementation, responsive to receiving a login request that is associated with a known IDP but not an existing account, the federated account module 310 coordinates the creation of an account and generates a login approval, which causes the login module 312 to log the user into the account on the RP server 118. The federated account module 310 and its functionality are discussed in greater detail below in reference to FIG. 5.

In one implementation, the federated account module 310 passes the login approval to the login module 312. For example, the legacy account module 308 is communicatively coupled to the login module 312 to send the login approval to the login module 312. In another implementation, the legacy account module 308 (or the communication interface 302) stores the login approval in the storage device 214 (or any other non-transitory storage medium communicatively accessible). The other modules of the unified login module 220 including the login module 312 can retrieve the login approval by accessing the storage device 214 (or other non-transitory storage medium).

The login module 312 is code and routines for logging the user into the RP server 118. In one implementation, the login module 312 is a set of instructions executable by the processor 206. In another implementation, the login module 312 is stored in the memory 208 and is accessible and executable by the processor 206. In either implementation, the login module 312 is adapted for cooperation and communication with the processor 206, other components of the computing device 200 and other components of the unified login module 220.

The login module 312 logs users into the RP server 118. In one implementation, the login module 312 logs the user into the RP server 118 responsive to receiving a login approval. For example, the login module 312 logs the user in responsive to receiving a login approval generated when the user successfully authenticates himself/herself via either the legacy account module 308 or the federated account module 310. In another example, the login module 312 logs the user in responsive to receiving a login approval generated when the user creates a new account via either the legacy account module 308 or the federated account module 310. The login module 312 and its functionality are discussed in greater detail below in reference to FIG. 6.

Figure 4:
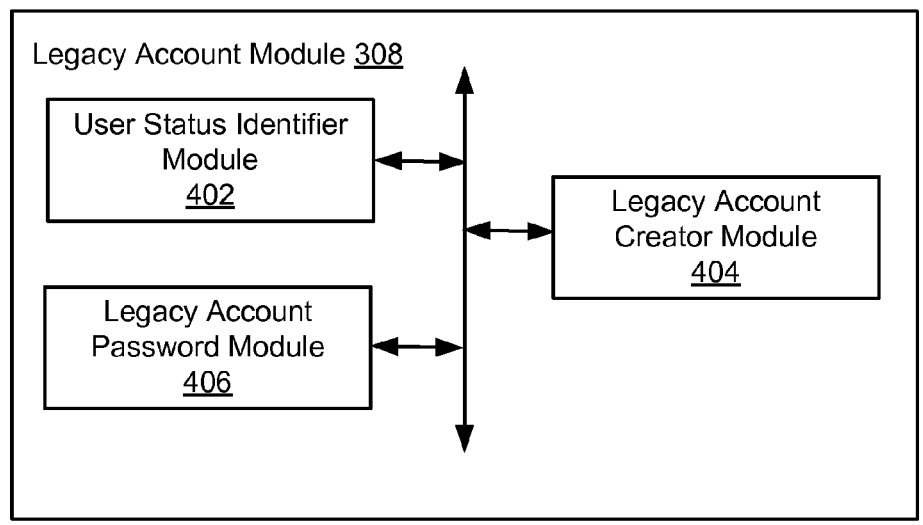
FIG. 4 is a block diagram illustrating a legacy account module according to one implementation.

Referring now to FIG. 4, one implementation of the legacy account module 308 is shown in more detail. FIG. 4 is a block diagram of one implementation of the legacy account module 308 including the unified login module 220.

In one implementation, the legacy account module 308 includes a user status identifier module 402, a legacy account creator module 404 and a legacy account password module 406. In one implementation, the modules 402, 404, 406 included in the legacy account module 308 are included in the RP server 118.

The user status identifier module 402 is code and routines for identifying the user's status. In one implementation, the user status identifier module 402 is a set of instructions executable by the processor 206. In another implementation, the user status identifier module 402 is stored in the memory 208 and is accessible and executable by the processor 206. In either implementation, the user status identifier module 402 is adapted for cooperation and communication with the processor 206, other components of the computing device 200 and other components of the unified login module 220 including the legacy account module 308.

The user status identifier module 402 identifies the status of the user requesting login. In one implementation, the status of the user includes whether the user is already logged in. For example, the user status identifier module 402 identifies whether the user already logged in and has an open session. In one such implementation, the legacy account module 308 will not generate a login approval until the user's open session is closed.

In one implementation, the status of the user is the user's account status. For example, the user status identifier module 402 identifies whether the user is associated with an existing account. For example, the user status identifier module 402 receives the user identifier and identifies whether an existing account is associated with the user based at least in part on the user identifier. In one implementation, the user status identifier module 402 prompts the legacy account password module 406 to verify the user's password responsive to identifying that the user is associated with an existing account. In one implementation, the user status identifier module 402 generates a legacy account creation request responsive to identifying that the user is not associated with an existing account. For example, assume the user status identifier module 402 compared the e-mail address from the login request to the e-mail addresses associated with user accounts and was unable to identify a matching e-mail address; the user status identifier module 402 generates a legacy account creation request in order to create a new legacy account.

In one implementation, the user status identifier module 402 passes the legacy account creation request to the legacy account creator module 404. For example, the user status identifier module 402 is communicatively coupled to the legacy account creator module 404 to send the legacy account creation request to the legacy account creator module 404. In another implementation, the user status identifier module 402 (or the communication interface 302) stores the legacy account creation request in the storage device 214 (or any other non-transitory storage medium communicatively accessible). The other modules of the unified login module 220 including the legacy account creator module 404 can retrieve the legacy account creation request by accessing the storage device 214 (or other non-transitory storage medium).

The legacy account creator module 404 is code and routines for creating a legacy account. In one implementation, the legacy account creator module 404 is a set of instructions executable by the processor 206. In another implementation, the legacy account creator module 404 is stored in the memory 208 and is accessible and executable by the processor 206. In either implementation, the legacy account creator module 404 is adapted for cooperation and communication with the processor 206, other components of the computing device 200 and other components of the unified login module 220 including the legacy account module 308.

The legacy account creator module 404 creates a legacy account on the RP server 118 for a user associated with an e-mail address that is not associated with a known IDP and is not associated with an existing account. A legacy account is a user account that is associated with a legacy password and is not accessible using a known IDP. A legacy password is a password stored and/or maintained by a requesting party and used to access a user's account on the RP server 118. In one implementation, the legacy password and legacy account are the traditional passwords and accounts maintained by websites. For example, in some implementations, the legacy account creator module 404 prompts the user for the user identifier or receives/retrieves the e-mail address from the login request and prompts the user to create a legacy password, which will be stored by the requesting party and used for future authentication of the user at login. Once the user selects a legacy password, a legacy account is created and associated with that user identifier and legacy password. In one implementation, after the legacy account has been created the legacy account creator module 404 generates a login approval so the user can be logged into the legacy account by the login module 312.

In one implementation, the legacy account creator module 404 passes the login approval to the login module 312. For example, the legacy account creator module 404 is communicatively coupled to the login module 312 to send the login approval to the login module 312. In another implementation, the legacy account creator module 404 (or the communication interface 302) stores the login approval in the storage device 214 (or any other non-transitory storage medium communicatively accessible). The other modules of the unified login module 220 including the login module 312 can retrieve the login approval by accessing the storage device 214 (or other non-transitory storage medium).

The legacy account password module 406 is code and routines for authenticating a user based at least in part on a legacy password. In one implementation, the legacy account password module 406 is a set of instructions executable by the processor 206. In another implementation, the legacy account password module 406 is stored in the memory 208 and is accessible and executable by the processor 206. In either implementation, the legacy account password module 406 is adapted for cooperation and communication with the processor 206, other components of the computing device 200 and other components of the unified login module 220 including the legacy account module 308.

The legacy account password module 406 is code and routines for authenticating a user based at least in part on a legacy password. In one implementation, the legacy account password module 406 receives a legacy password from the user. For example, the legacy account password module 406 prompts the user to enter his/her password. In one implementation, the legacy account password module 406 compares the password received from the user with the legacy password associated with the existing legacy account, and if the two passwords match, the legacy account password module 406 generates a login approval so the user can be logged into the legacy account by the login module 312.

In one implementation, the legacy account password module 406 passes the login approval to the login module 312. For example, the legacy account password module 406 is communicatively coupled to the login module 312 to send the login approval to the login module 312. In another implementation, the legacy account password module 406 (or the communication interface 302) stores the login approval in the storage device 214 (or any other non-transitory storage medium communicatively accessible). The other modules of the unified login module 220 including the login module 312 can retrieve the login approval by accessing the storage device 214 (or other non-transitory storage medium).

Figure 5:
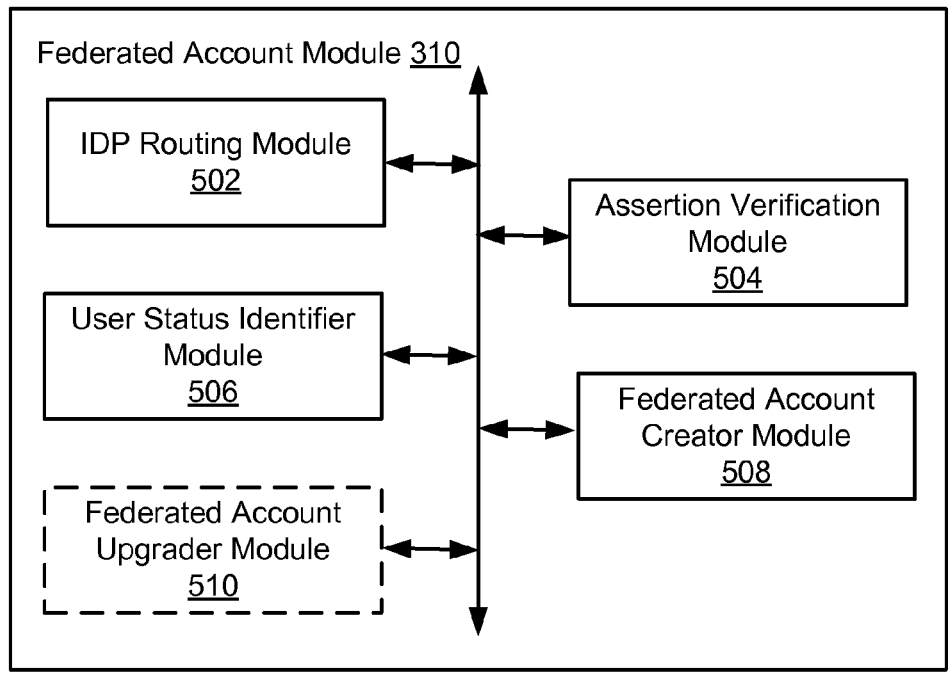
FIG. 5 is a block diagram illustrating a federated account module according to one implementation.

Referring now to FIG. 5, one implementation of the federated account module 310 is shown in more detail. FIG. 5 is a block diagram of one implementation of the federated account module 310 including the unified login module 220.

In one implementation, the federated account module 310 includes an IDP routing module 502, an assertion verification module 504, a user status identifier module 506, a federated account creator module 508 and an optional federated account upgrader module 510.

It will be recognized that the modules 502, 504, 506, 508, 510 included in the federated account module 310 are not necessarily all on the same computing device 200. In one implementation, the modules 502, 504, 506, 508, 510 are distributed across multiple computing devices 200. For example, in one implementation, the user status identifier module 506, the federated account creator module 508 and the federated account upgrader module 510 are included in RP server 118 and the other modules 502, 504 are included in the identity toolkit server 160. It will be recognized that the preceding is just an example of distributing modules across multiple computing devices 200 and that other examples exist.

The IDP routing module 502 is code and routines for routing a user to the known IDP associated with the user identifier. In one implementation, the IDP routing module 502 is a set of instructions executable by the processor 206. In another implementation, the IDP routing module 502 is stored in the memory 208 and is accessible and executable by the processor 206. In either implementation, the IDP routing module 502 is adapted for cooperation and communication with the processor 206, other components of the computing device 200 and other components of the unified login module 220 including the federated account module 310.

The IDP routing module 502 routes a user to the known IDP associated with the user identifier. In one implementation, the IDP routing module 502 routes a user to the known IDP determined by the IDP determination module 306. For example, assume that the IDP routing module 502 retrieves/receives from the IDP determination module 306 that the login request is associated with and IDP called "IDP1." The IDP routing module 502, in one implementation, retrieves from a table or index the web address associated with "IDP1" and routes the user (e.g., launches a new browser window or redirects the current browser window) to that web address. Once the user is directed to the web address of the known IDP associated with the user identifier, the user authenticates himself/herself to that IDP (e.g. via IDP server 180a). In another implementation, the IDP determination module 306 determines only whether the login request is associated with a known IDP, and the IDP routing module must determine which known IDP the login request is associated with and route the user to that known IDP for authentication. Regardless of the implementation, upon the user successfully authenticating himself/herself to the IDP, the IDP (i.e., an IDP server 180 associated with an IDP) generates assertion data.

The assertion verification module 504 is code and routines for receiving and verifying assertion data from an IDP server 180. In one implementation, the assertion verification module 504 is a set of instructions executable by the processor 206. In another implementation, the assertion verification module 504 is stored in the memory 208 and is accessible and executable by the processor 206. In either implementation, the assertion verification module 504 is adapted for cooperation and communication with the processor 206, other components of the computing device 200 and other components of the unified login module 220 including the federated account module 310.

In one implementation, the assertion verification module 504 receives the assertion data directly from an IDP server 180. In another implementation, the assertion verification module 504 receives the assertion data from the RP server 118, which received the assertion data from the IDP server 180. In yet other implementations, the assertion verification module 504 retrieves the assertion data from one of the RP server 118 and IDP server 180.

In one implementation, the assertion verification module 504 is included in the identity toolkit server 160. In one such implementation, the assertion verification module 504 verifies the assertion data generated responsive to the user successfully authenticating himself/herself to the IDP. In one implementation, the assertion verification module 504 verifies that the assertion data contains the expected and/or proper cryptographic data and encryptions.

In another implementation, the assertion verification module 504 is included on a server other than the identity toolkit server 160 (e.g. the RP server 118) and verifies the assertion data by sending the assertion data to the identity toolkit server 160 and receiving verification from the identity toolkit server 160.

In one implementation, if the assertion data cannot be verified, the assertion verification module 504 generates an error message and redirects the user to begin the process over again by generating a new login request. In one implementation, if the assertion is verified, the status of the user is identified by the user status identifier module 506.

The user status identifier module 506 is code and routines identifying the status of a user. In one implementation, the user status identifier module 506 is a set of instructions executable by the processor 206. In another implementation, the user status identifier module 506 is stored in the memory 208 and is accessible and executable by the processor 206. In either implementation, the user status identifier module 506 is adapted for cooperation and communication with the processor 206, other components of the computing device 200 and other components of the unified login module 220 including the federated account module 310.

The user status identifier module 506 identifies the status of the user requesting login. In one implementation, the status of the user includes whether the user is already logged in. For example, the user status identifier module 506 identifies whether the user already logged in and has an open session. In one such implementation, the federated account module 310 will not generate a login approval until the user's open session is closed.

In one implementation, the status of the user is the user's account status. For example, the user status identifier module 506 identifies whether the user is associated with an existing account. In one implementation, the user status identifier module 506 generates a federated account creation request responsive to identifying that the user is not associated with an existing account. For example, assume the user status identifier module 506 compared the e-mail address from the login request to the e-mail addresses associated with user accounts and was unable to identify a matching e-mail address, the user status identifier module 506 generates a federated account creation request in order to create a new federated account.

In one implementation, the user status identifier module 506 passes the federated account creation request to the federated account creator module 508. For example, the user status identifier module 506 is communicatively coupled to the federated account creator module 508 to send the federated account creation request to the federated account creator module 508. In another implementation, the user status identifier module 506 (or the communication interface 302) stores the federated account creation request in the storage device 214 (or any other non-transitory storage medium communicatively accessible). The other modules of the unified login module 220 including the federated account creator module 508 can retrieve the federated account creation request by accessing the storage device 214 (or other non-transitory storage medium).

In one implementation, the user status identifier module 506 generates a login approval responsive to identifying that the user is associated with an existing account. In one implementation, the user status identifier module 506 passes the login approval to the login module 312. For example, the user status identifier module 506 is communicatively coupled to the login module 312 to send the login approval to the login module 312. In another implementation, the user status identifier module 506 (or the communication interface 302) stores the login approval in the storage device 214 (or any other non-transitory storage medium communicatively accessible). The other modules of the unified login module 220 including the login module 312 can retrieve the login approval by accessing the storage device 214 (or other non-transitory storage medium).

The federated account creator module 508 is code and routines for creating a federated account. In one implementation, the federated account creator module 508 is a set of instructions executable by the processor 206. In another implementation, the federated account creator module 508 is stored in the memory 208 and is accessible and executable by the processor 206. In either implementation, the federated account creator module 508 is adapted for cooperation and communication with the processor 206, other components of the computing device 200 and other components of the unified login module 220 including the federated account module 310.

The federated account creator module 508 creates a federated account on the RP server 118 for a user associated with an e-mail address that is associated with a known IDP and is not associated with an existing account. A federated account is a user account that is accessible using a known IDP. A federated account may or may not be associated with a legacy password. In one implementation, after the federated account has been created the federated account creator module 508 generates a login approval so the user can be logged into the federated account by the login module 312.

In one implementation, the federated account creator module 508 passes the login approval to the login module 312. For example, the federated account creator module 508 is communicatively coupled to the login module 312 to send the login approval to the login module 312. In another implementation, the federated account creator module 508 (or the communication interface 302) stores the login approval in the storage device 214 (or any other non-transitory storage medium communicatively accessible). The other modules of the unified login module 220 including the login module 312 can retrieve the login approval by accessing the storage device 214 (or other non-transitory storage medium).

The optional federated account upgrader module 510 is code and routines for upgrading a federated account. In one implementation, the federated account upgrader module 510 is a set of instructions executable by the processor 206. In another implementation, the federated account upgrader module 510 is stored in the memory 208 and is accessible and executable by the processor 206. In either implementation, the federated account upgrader module 510 is adapted for cooperation and communication with the processor 206, other components of the computing device 200 and other components of the unified login module 220 including the federated account module 310.

The federated account upgrader module 510 upgrades a federated account by deleting any legacy password associated with the account. The deletion of any legacy password is potentially beneficially, because, after its deletion, the only remaining access the account is via IDP authentication. After the account is upgraded, there is no legacy password to the account that can be forgotten by the user and/or discovered by a fraudulent user and used to access the account, thereby undermining the security provided by IDP authentication.

Figure 6:
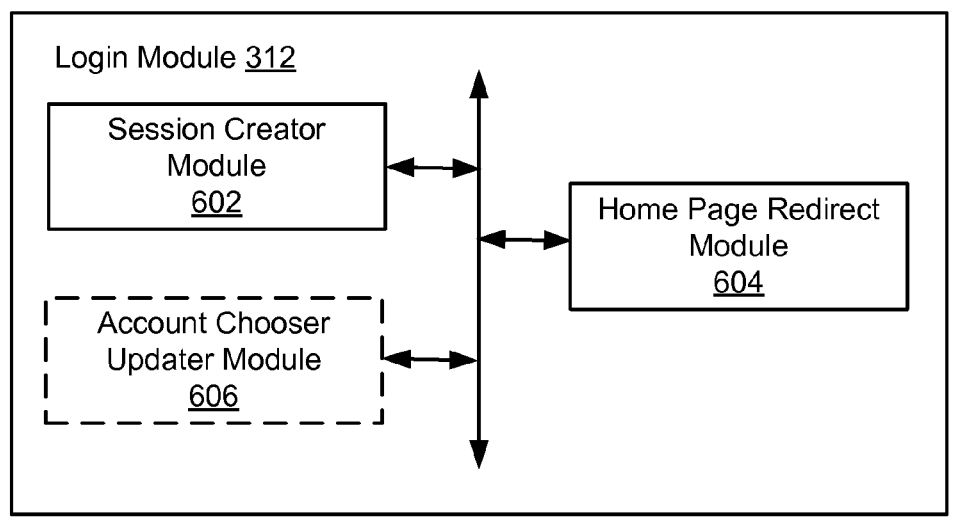
FIG. 6 is a block diagram illustrating a login module according to one implementation.

Referring now to FIG. 6, one implementation of the login module 312 is shown in more detail. FIG. 6 is a block diagram of one implementation of the login module 312 including the unified login module 220.

In one implementation, the login module 312 includes a session creator module 602, a home page redirect module 604 and an account chooser updater module 606.

The session creator module 602 is code and routines for creating a user session on the RP server 118. In one implementation, the session creator module 602 is a set of instructions executable by the processor 206. In another implementation, the session creator module 602 is stored in the memory 208 and is accessible and executable by the processor 206. In either implementation, the session creator module 602 is adapted for cooperation and communication with the processor 206, other components of the computing device 200 and other components of the unified login module 220.

The session creator module 602 creates a user session on the RP server 118, thereby allowing the user to access one or more of the services, functionality, data and information provided and/or maintained by the RP server 118.

The home page redirect module 604 is code and routines for redirecting the user to a home page. In one implementation, the home page redirect module 604 is a set of instructions executable by the processor 206. In another implementation, the home page redirect module 604 is stored in the memory 208 and is accessible and executable by the processor 206. In either implementation, the home page redirect module 604 is adapted for cooperation and communication with the processor 206, other components of the computing device 200 and other components of the unified login module 220.

The home page redirect module 604 redirects the user to a home page. In one implementation, the home page is the home page of the requesting party. In another implementation, the home page is a page associated with the user's account with the requesting party. In yet another implementation, the home page is set and/or determined by the user.

The optional account chooser updater module 606 is code and routines for updating an account chooser. In one implementation, the account chooser updater module 606 is a set of instructions executable by the processor 206. In another implementation, the account chooser updater module 606 is stored in the memory 208 and is accessible and executable by the processor 206. In either implementation, the account chooser updater module 606 is adapted for cooperation and communication with the processor 206, other components of the computing device 200 and other components of the unified login module 220.

The account chooser updater module 606 updates the account chooser. In some implementations where the login request receiver module 304 generates a GUI that includes an account chooser, the accounts available to be selected from are made available by the account chooser updater module 606. In one implementation, the account chooser updater module 606 updates the account chooser by generating account chooser update information. For example, the account chooser update information may be in the form of a cookie. For example, the account chooser updater module 606 creates a cookie the first time a user logs in on a client device 115/browser 198 and that cookie causes the user's account to appear in the account chooser on subsequent logs in using that client device 115/browser 198.

In one implementation, the account chooser updater module 606 passes the account chooser update information to the login request receiver module 304. For example, the account chooser updater module 606 is communicatively coupled to the login request receiver module 304 to send the account chooser update information to the login request receiver module 304. In another implementation, the account chooser updater module 606 (or the communication interface 302) stores the account chooser update information in the storage device 214 (or any other non-transitory storage medium communicatively accessible) or on the user device 115. The other modules of the unified login module 220 including the login request receiver module 304 can retrieve the account chooser update information by accessing the storage device 214 (or other non-transitory storage medium).

Figure 7:
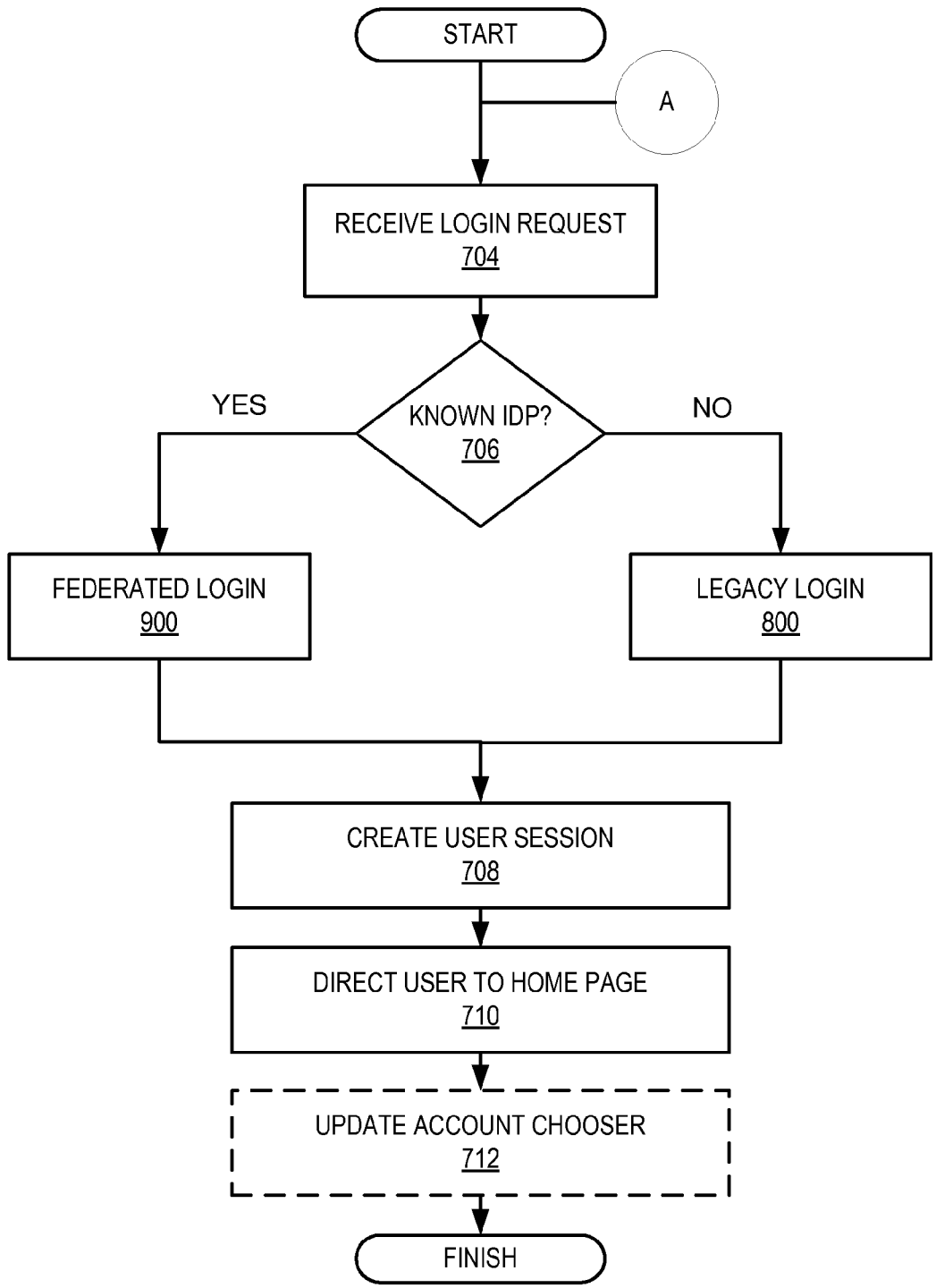
FIG. 7 is a flow chart illustrating a method for enabling, on any website, a unified user login that supports login through multiple known identity providers and, if necessary, the website's legacy login according to one implementation.
Figure 8:
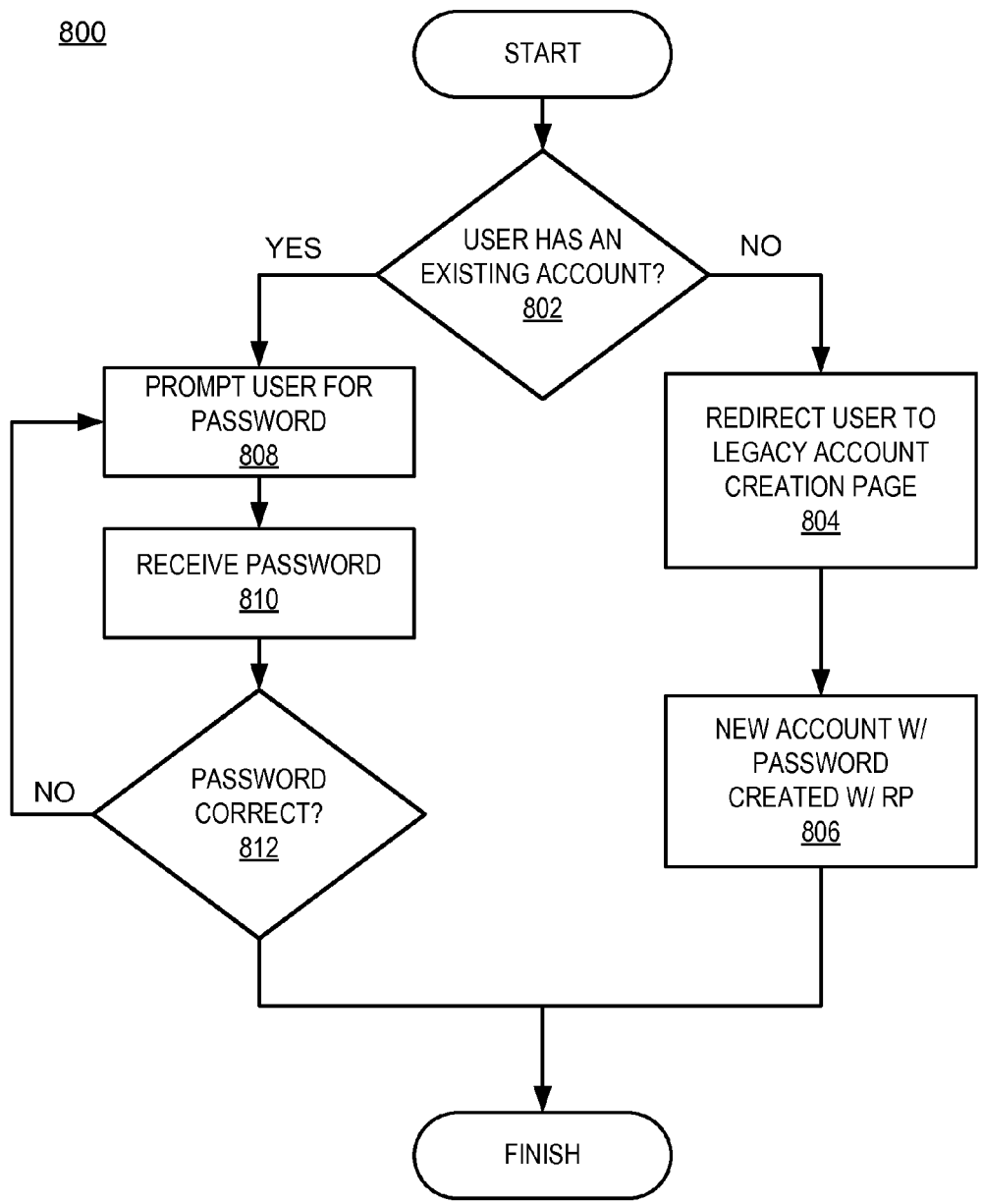
FIG. 8 is a flow chart illustrating a method for performing a legacy login according to one implementation.
Figure 9:
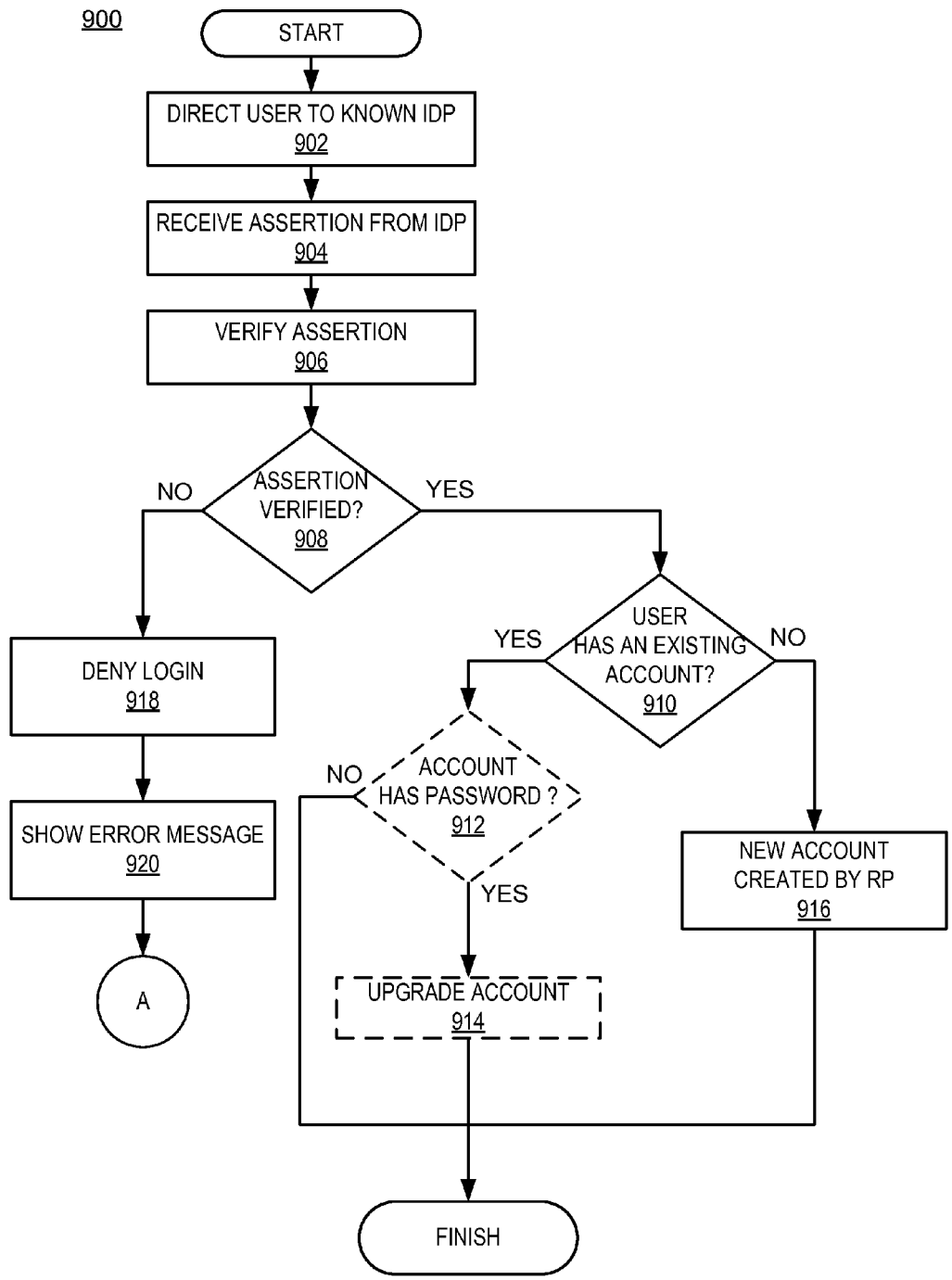
FIG. 9 is a flow chart illustrating a method for performing a federated login according to one implementation.

FIGS. 7, 8 and 9 depict various methods 700, 800 and 900 performed by the system described above in reference to FIGS. 1-6. Steps that are optional or performed by optional modules are depicted in dashed boxes or blocks.

FIG. 7 is a flow chart illustrating a method 700 for enabling, on any website, a unified user login that supports login through multiple known identity providers and, if necessary, the website's legacy login according to one implementation. At block 704, the login request receiver module 304 of the unified login module 220 receives a login request based at least in part on the user identifier. At block 704, the IDP determination module 306 of the unified login module 220 determines whether the login request is associated with a known IDP. If the IDP determination module 306 determines that the login request is not associated with a known IDP (706—No), a legacy login 800, which is discussed in detail below in reference to FIG. 8, is performed by the legacy account module 308 of the unified login module 220. If the IDP determination module 306 determines that the login request is associated with a known IDP (706—Yes), a federated login 900, which is discussed in detail below in reference to FIG. 9, is performed by the federated account module 310 of the unified login module 220. At block 708, the login module 312 of the unified login module 220 creates a user session on the RP server responsive to completion of either the legacy login 800 or the federated login 900. At block 710, the login module 312 directs the user to a home page. At block 712, the login server 312 optionally updates an account chooser (assuming that the login request receiver module 304 provides an account chooser).

FIG. 8 is a flow chart illustrating a method 800 for performing a legacy login 800 according to one implementation. At block 802, the user status identifier module 402 of the legacy account module 308 determines whether the login request is associated with an existing account.

If the user status identifier module 402 determines that the user does not have an existing account (802—No), the user status identifier module 402 redirects the user to a legacy account creation page at block 804. At block 806, the legacy account creator module 404 of the legacy account module 308 creates a new account (with a legacy password) with the RP server 118. The legacy login 800 is completed and the method continues at block 708 (See FIG. 7).

If the user status identifier module 402 determines that the user has an existing account (802—Yes), the legacy account password module 406 of the legacy account module 308 prompts the user to enter the user's legacy password at block 808, which is received by the legacy account password module 406 at block 810. At block 812, the legacy account password module 406 determines whether the password entered is correct. If the legacy account password module 406 determines that the password was incorrect (812—No), the user is prompted by the legacy account password module 406 to re-enter the user's password at block 808. If the legacy account password module 406 determines that the password was correct (812—Yes), the legacy login 800 is completed and the method continues at block 708 (See FIG. 7).

FIG. 9 is a flow chart illustrating another method 900 for performing a federated login 900 according to one implementation. At block 902, the IDP routing module of the federated account module 310 directs the user to the known IDP associated with the user's login request. At block 904, the assertion verification module 504 of the federated account module 310 receives assertion data that was generated by the known IDP responsive to the user successfully authenticating himself/herself to the known IDP. At block 906, the assertion verification module 504 verifies the assertion data. At block 908, the assertion verification module 504 determines if the assertion data was verified.

If the assertion data was not verified (908—No), the assertion verification module 504 denies the login at block 918, displays an error message to the user at block 920 and directs the user to the login screen where the user may generate a new login request at block 704 (See FIG. 7). If the assertion data was verified (908—Yes), the user status identifier module 506 of the federated account module 310 determines whether the user is associated with an existing account at block 910.

If the user is not associated with an existing account (910—No), the federated account creator module 508 causes a new account to be created with the RP server 118 completing the federated login 900 and the method continues at block 708 (See FIG. 7). If the user is associated with an existing account (910—Yes), the optional federated account upgrader module 510 of the federated account module 310 determines whether the account has a legacy password at block 912.

If the account does not have a legacy password (912—No), the federated login 900 is completed and the method continues at block 708 (See FIG. 7). If the account has a legacy password (912—Yes), the federated account upgrader module 510 upgrades the federated account by deleting the legacy password at block 914 completing the federated login 900 and the method continues at block 708 (See FIG. 7).

Figure 10:
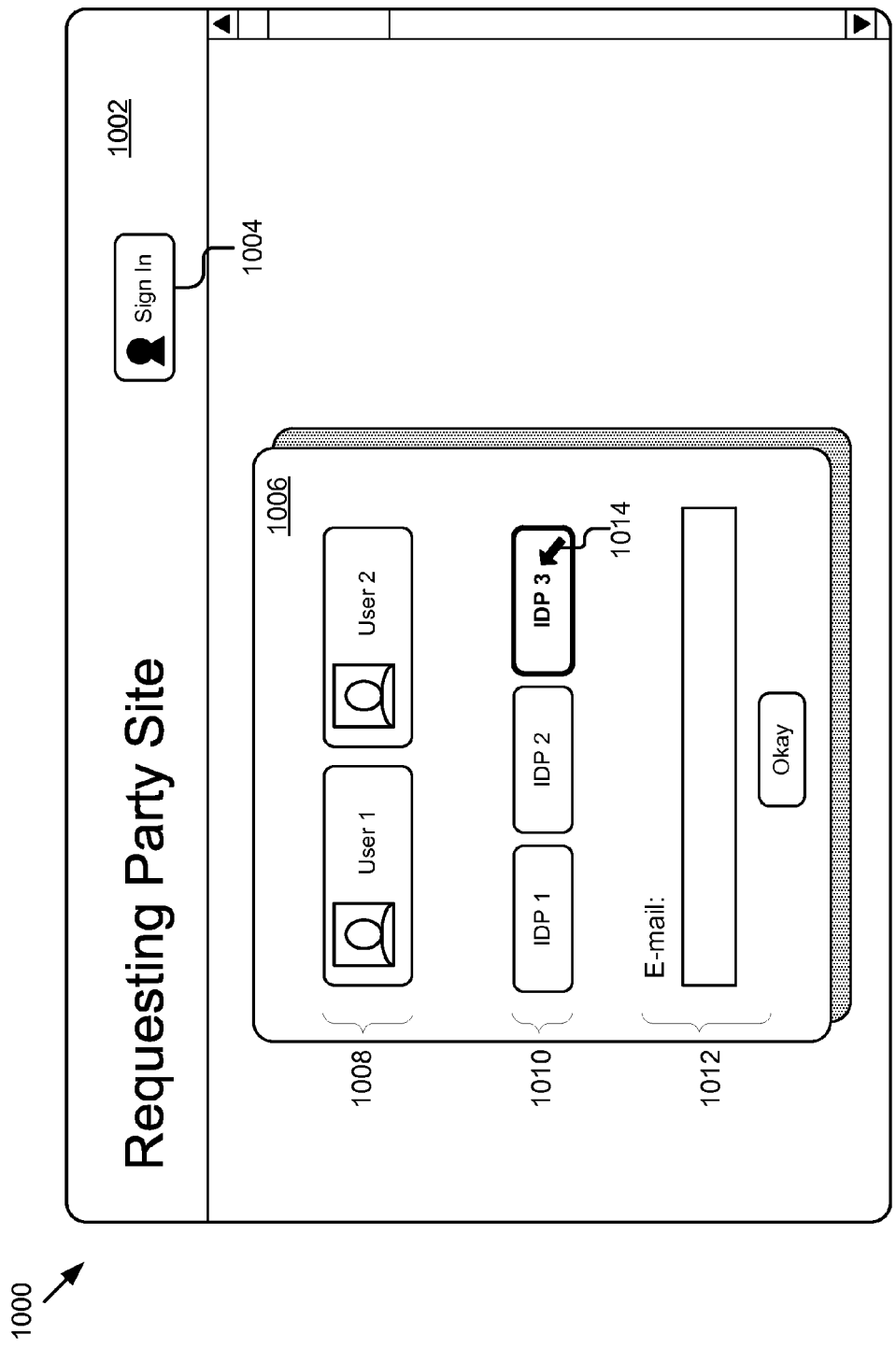
FIG. 10 is a graphic representation of an example of a user interface displaying a requesting party site enabling user login with an identity provider according to one implementation.

FIG. 10 is a graphical representation of an example of a user interface 1000 displaying the login page 1002 of a requesting party according to one implementation. In the illustrated implementation, the login page 1002 includes a login button displayed here as "Sign in" button 1004, which, when selected by input device 1014, causes the pop-up window 1006 to be displayed. In one implementation, the "Sign in" button 1004 has a standardized appearance that has a substantially identical appearance on all requesting party websites that permit unified login. For example, the "Sign in" button 1004 includes a recognizable icon such as a keyhole. Pop-up window 1006 is a GUI that the user may interact with to generate a login request. In the illustrated implementation, the user may generate a login request by selecting a user associated with a button from the account chooser 1008, selecting an IDP associated with a button in the IDP chooser 1010 or by entering the user identifier in field 1012 and selecting "Okay."

The foregoing description of the implementations has been presented for the purposes of illustration and description. It is not intended to be exhaustive or to limit the present implementations to the precise forms disclosed. Many modifications and variations are possible in light of the above teaching. It is intended that the scope of the present implementations be limited not by this detailed description, but rather by the claims of this application. The present implementations may take other specific forms without departing from the spirit or essential characteristics thereof. Likewise, the particular naming and division of the modules, routines, features, attributes, methodologies and other aspects are not mandatory or significant, and the mechanisms that implement one implementation or its features may have different names, divisions and/or formats. Furthermore, as will be apparent, the modules, routines, features, attributes, methodologies and other aspects of the implementations can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the implementations are in no way limited to implementation in any specific programming language, or for any specific operating system or environment. Accordingly, the disclosure is intended to be illustrative, but not limiting, of the scope, which is set forth in the following claims.

What is claimed is:

1. A computer-implemented method comprising:
  receiving a login request from a user to access an account, wherein the login request is associated with a user identifier;
  parsing the user identifier to determine a domain;
  determining automatically whether the login request is associated with a known identity provider based at least in part on the determined domain;
  directing the user to the known identity provider for authentication responsive to determining, based at least in part on the determined domain, that the login request is associated with the known identity provider;
  receiving assertion data and information responsive to the known identity provider authenticating the user;
  verifying assertion data using an online verification service;
  determining whether the user is associated with an existing account after verifying the assertion data;
  responsive to the verification of the assertion data and the determination that the user is not associated with the existing account, creating a new account for the user and logging the user into the new account; and responsive to the verification of the assertion data and the determination that the user is associated with the existing account, logging the user into the account.

2. The method of claim 1 further comprising:
sending an error message responsive to unsuccessful verification of the assertion data; and
prompting the user to create another login request.

3. The method of claim 1 further comprising:
directing the user to the account's legacy login page responsive to determining that the determined domain is not associated with any known identity provider and determining the user is associated with an existing account;
receiving a legacy password of the user, wherein the legacy password is a password for the account of the user;
verifying the user based at least in part on the legacy password; and
logging the user into the account responsive to verifying the user based at least in part on the legacy password.

4. The method of claim 1 further comprising:
directing the user to the account's legacy account creation page responsive to determining that the determined domain is not associated with any known identity provider and determining that the user is not associated with an existing account;
creating a new account including a legacy password; and
logging the user into the new account responsive to the creation of the new account.

5. The method of claim 1 wherein logging the user into the account further comprises:
creating a user session;
directing the user to the account's home page; and
updating an account chooser.

6. A computer program product comprising a non-transitory computer readable medium encoding instructions that, in response to execution by a computing device, cause the computing device to perform operations comprising:
receiving a login request from a user to access an account, wherein the login request is associated with a user identifier;
parsing the user identifier to determine a domain;
determining automatically whether the login request is associated with a known identity provider based at least in part on the determined domain, wherein the determined domain is associated with one known identity provider at most;
directing the user to the known identity provider for authentication responsive to determining, based at least in part on the determined domain, that the login request is associated with the known identity provider;
receiving assertion data and information responsive to the known identity provider authenticating the user;
verifying assertion data using an online verification service;
determining whether the user is associated with an existing account after verifying the assertion data;
responsive to the verification of the assertion data and the determination that the user is not associated with the existing account, creating a new account for the user and logging the user into the new account; and
responsive to the verification of the assertion data and the determination that the user is associated with the existing account, logging the user into the account.

7. The computer program product of claim 6, the operations further comprising:
sending an error message responsive to unsuccessful verification of the assertion data; and
prompting the user to create another login request.

8. The computer program product of claim 6, the operations further comprising:
directing the user to a legacy login page of the user responsive to determining that the determined domain is not associated with any known identity provider and determining the user is associated with an existing account;
receiving a legacy password, wherein the legacy password is the user's password for the account;
verifying the user based at least in part on the legacy password; and
logging the user into the account responsive to verifying the user based at least in part on the legacy password.

9. The computer program product of claim 6, the operations further comprising:
directing the user to the account's legacy account creation page responsive to determining that the determined domain is not associated with any known identity provider and determining that the user is not associated with an existing account;
creating a new account including a legacy password; and
logging the user into the new account responsive to the creation of the new account.

10. The computer program product of claim 6, wherein logging the user into the account further comprises the operations:
creating a user session;
directing the user to the account's home page; and
updating an account chooser.

11. A system for user login, the system comprising:
a login receiver module operable to receive a login request from a user to access an account, wherein the login request is associated with a user identifier;
an identity provider determination module operable to parse the user identifier to determine a domain, and determine whether the login request is associated with a known identity provider based at least in part on the determined domain, wherein the determined domain is associated with one known identity provider at most;
a legacy account module operable to perform one or more of legacy account creation and legacy login verification responsive to a determination that the determined domain is not associated with any known identity provider;
a federated account module operable to perform one or more of federated account creation and federated login verification responsive to a determination, based at least in part on the determined domain, that the determined domain is associated with the known identity provider, the federated account module including an account upgrader module operable to determine whether the existing account is associated with a legacy password and, responsive to determining that the existing account is associated with the legacy password, deleting the legacy password; and
a login module operable to log the user into the account responsive to one or more of verification by the legacy account module or the federated account module and account creation by the legacy account module or the federated account module, the login module communicatively coupled to receive one or more of verification and account creation from one or more of the legacy account module and the federated account module.

12. The system of claim 11 wherein the legacy account module further comprises:
- a user status identifier module operable to identify whether the user is associated with an existing account;
- a legacy account creator module operable to create a new legacy account including a legacy password responsive to identifying that the user is not associated with any existing account; and
- a legacy account password module operable to verify the user based at least in part on a legacy password responsive to identifying that the user is associated with the existing account.

13. The system of claim 11 wherein the federated account module further comprises:
- an identity provider routing module operable to direct the user to the known identity provider associated with the login request;
- an assertion verification module operable to receive assertion data responsive to successful authentication of the user by the known identity provider and operable to verify assertion data using an online verification service;
- a user status identifier module operable to identify whether the user is associated with an existing account; and
- an account creator module operable to create a new account responsive to identifying that the user is not associated with any existing account.

14. The system of claim 13, wherein the assertion verification module is operable to perform one or more of sending an error message and prompting the user to create another login request responsive to unsuccessful verification of the assertion data.

15. The system of claim 11, wherein the login request receiver module receives a login request that is one or more of the user entering the user identifier, the user selecting an account from an account chooser, and the user selecting an identity provider.

* * * * *